(12) United States Patent
Yoshida

(10) Patent No.: US 9,731,817 B2
(45) Date of Patent: Aug. 15, 2017

(54) AIRCRAFT TIRE

(71) Applicant: DAITO PRESS Mfg. Co., Ltd., Osaka-shi, Osaka (JP)

(72) Inventor: Takashi Yoshida, Osaka (JP)

(73) Assignee: DAITO PRESS MFG. CO., LTD., Osaka-Shi, Osaka (JP)

( * ) Notice: Subject to any disclaimer, the term of this patent is extended or adjusted under 35 U.S.C. 154(b) by 218 days.

(21) Appl. No.: 14/811,226

(22) Filed: Jul. 28, 2015

(65) Prior Publication Data

US 2016/0059955 A1    Mar. 3, 2016

(30) Foreign Application Priority Data

Aug. 26, 2014 (JP) ................................. 2014-171669

(51) Int. Cl.
*B60C 13/00* (2006.01)
*B60C 13/02* (2006.01)
*B64C 25/40* (2006.01)

(52) U.S. Cl.
CPC ............. *B64C 25/40* (2013.01); *B60C 13/02* (2013.01); *B60C 2200/02* (2013.04)

(58) Field of Classification Search
CPC ....... B60C 13/00; B60C 13/002; B60C 13/02; B60C 13/023
See application file for complete search history.

(56) References Cited

U.S. PATENT DOCUMENTS 1,833,019 A * 11/1931 Faucher .................. B64C 25/40
152/523

FOREIGN PATENT DOCUMENTS

| DE | 2613486 | * | 10/1977 |
| DE | 10315813 | * | 11/2004 |
| GB | 562651 | * | 7/1944 |
| GB | 2352431 | * | 1/2001 |
| JP | 09254892 A | | 9/1997 |
| WO | WO 2005/025982 | * | 3/2005 |

* cited by examiner

*Primary Examiner* — Justin Fischer
(74) *Attorney, Agent, or Firm* — Holtz, Holtz & Volek PC

(57) ABSTRACT

An aircraft tire capable of suppressing rubber tire wear during landing and shocks which accelerate or decelerate an aircraft at touchdown includes, on a side of a tire body constituting an outer peripheral part of an aircraft wheel, a protrusion for receiving flight wind pressure. The wheel is rotated ahead of the touchdown by the action of the wind pressure received by the protrusion in a direction in which the wheel rotates during a landing roll. Weight is inserted into a hollow part of the protrusion. Through use of centrifugal force on the weight in association with a rotational motion of the wheel, the protrusion is deformed to change its wind pressure receiving area for bringing rotational speed of the wheel ahead of the touchdown close to a rotating speed of the wheel that is consistent with a flying speed of the aircraft making the touchdown.

1 Claim, 4 Drawing Sheets

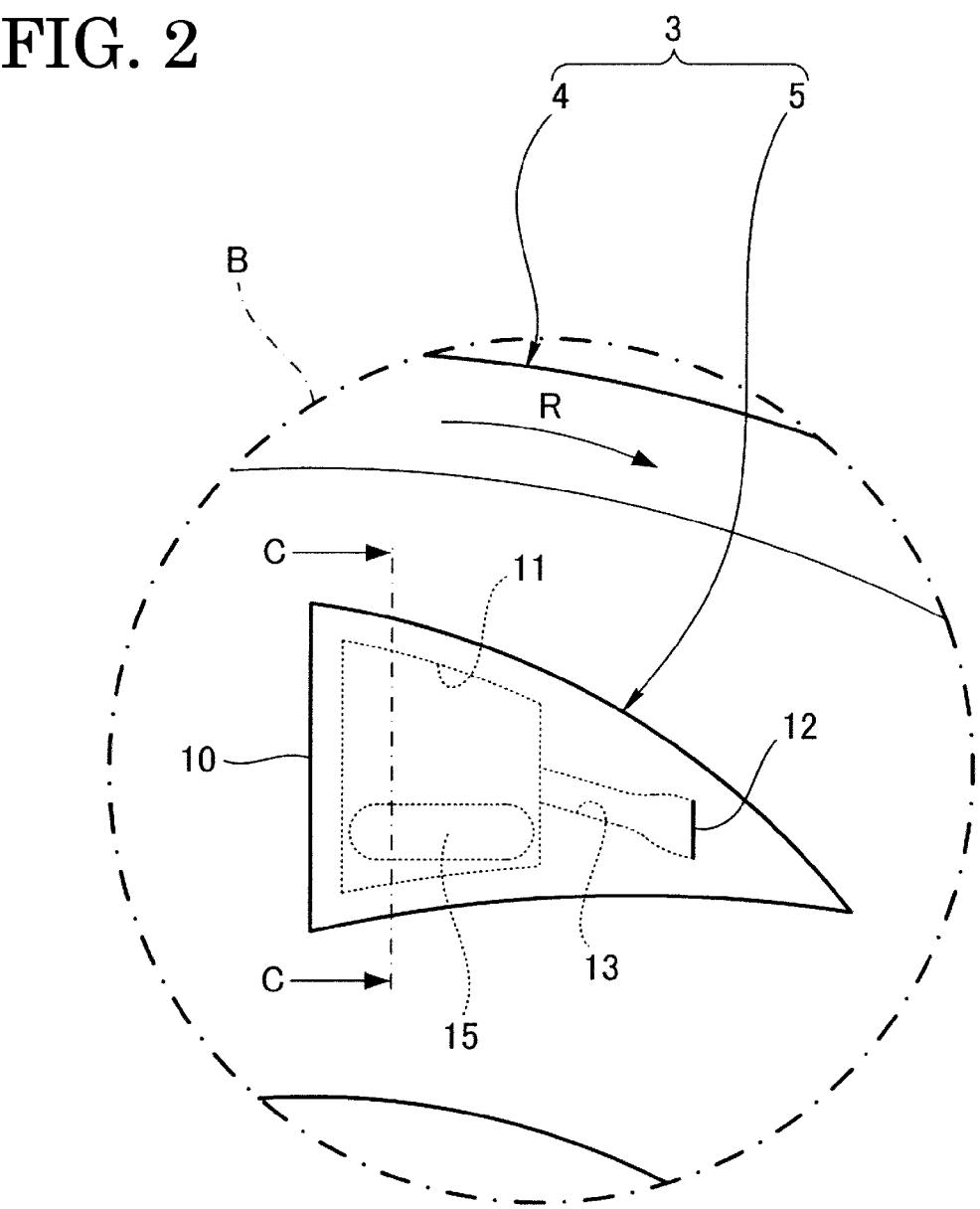

AIRCRAFT TIRE

FIELD OF THE INVENTION

The present invention relates to an aircraft tire which rotates by receiving flight wind pressure, and more particularly to an aircraft tire having a speed control function.

BACKGROUND ART

An ultra-high-capacity aircraft such as Airbus A380 weighs 560 tonnes, and its big body must be supported by two tires at a nose landing gear and twenty tires at a main landing gear, that is, twenty two tires in total. An internal pressure of the tire used for such an aircraft is six or more times higher than a tire for a passenger car, so that measures for improving material quality of the aircraft tire, its surface structure etc. have been taken.

When an aircraft is in a landing process, an aircraft wheel remains stationary before touchdown, so that high pressurized friction is generated between a runway and the tire until rotating speed of the wheel matches a rotating speed (hereinafter referred to as a target rotating speed $V_A$) which is consistent with a flying speed of the aircraft making the touchdown (for example, about 250 km/h). Because of the high pressurized friction, the tire contacts the runway while heated to a considerably high temperature, which results in tire wear enough to leave a rubber tire burn mark on the runway.

To solve such a problem, a technique such as follows is proposed. A plurality of curved vanes are arranged on a side of a tire body for receiving flight wind pressure. Through the action of the flight wind pressure received by the curved vanes, an aircraft wheel is rotated ahead of the touchdown in a direction in which it rotates during a landing roll (refer to, for example, Japanese Patent Unexamined Publication No. H09-254892).

According to the technique disclosed in the above-mentioned Japanese Patent Unexamined Publication No. H09-254892, by the action of the flight wind pressure received by the curved vanes arranged on the side of the tire body, the aircraft wheel is rotated ahead of the touchdown in the direction in which it rotates during the landing roll, so that the pressurized friction between the runway and the tire can be reduced substantially during the landing of the aircraft, thus allowing suppression of the rubber tire wear which occurs during the landing.

However, the technique disclosed in this Japanese Patent Unexamined Publication No. H09-254892 has the following problem. When the landing is made with the rotating speed of the wheel ahead of the touchdown exceeding the target rotating speed $V_A$, a shock that accelerates the aircraft is generated at the touchdown. On the other hand, when the landing is made with the rotating speed of the wheel ahead of the touchdown not reaching the target rotating speed $V_A$, a shock that decelerates the aircraft is generated at the touchdown.

The present invention is directed toward solving the problems discussed above and aims to provide an aircraft tire capable of suppressing rubber tire wear which occurs during landing as well as shocks that accelerate or decelerate an aircraft at touchdown.

SUMMARY OF THE INVENTION

To achieve the above object, a tire for an aircraft according to the present invention is provided, the tire comprising:

a protrusion for receiving flight wind, provided on a side of a tire body that constitutes an outer peripheral part of an aircraft wheel, the aircraft wheel made to rotate ahead of touchdown in a direction in which the wheel rotates during a landing roll by the action of the flight wind pressure received by the protrusion, wherein the protrusion has hollow structure into which a weight is inserted and the protrusion is deformed by centrifugal force applied to the weight in association with a rotational motion of the wheel thereby to change a flight wind pressure receiving area so that a rotating speed of the wheel ahead of the touchdown is brought close to a rotating speed of the wheel that is consistent with a flying speed of the aircraft at the time of touchdown.

In the aircraft tire of the invention, by the action of the flight wind pressure received by the protrusion provided on the side of the tire body, the wheel is rotated ahead of the touchdown in the direction in which it rotates during the landing roll, so that pressurized friction between a runway and the tire can be reduced substantially during landing of the aircraft, thereby allowing suppression of rubber tire wear which occurs during the landing.

The protrusion provided on the side of the tire body is hollow, and since the weight is inserted into this hollow protrusion, the centrifugal force applied to the weight in association with the rotational motion of the wheel deforms the protrusion, thus the flight wind pressure receiving area of the protrusion changes. In this way, the rotating speed of the wheel ahead of the touchdown is brought close to the rotating speed of the wheel that is consistent with the flying speed of the aircraft making the touchdown, whereby a difference between these rotating speeds of the wheel can be reduced. Consequently, shocks that accelerate or decelerate the aircraft at the touchdown can be suppressed.

BRIEF DESCRIPTION OF THE DRAWINGS

FIG. 2 is an enlarged view of part B in FIG. 1(b).

DETAILED DESCRIPTION OF THE INVENTION

A concrete exemplary embodiment of an aircraft tire according to the present invention is demonstrated hereinafter with reference to the accompanying drawings.

(Description of an Aircraft Wheel)

Figure 1A:
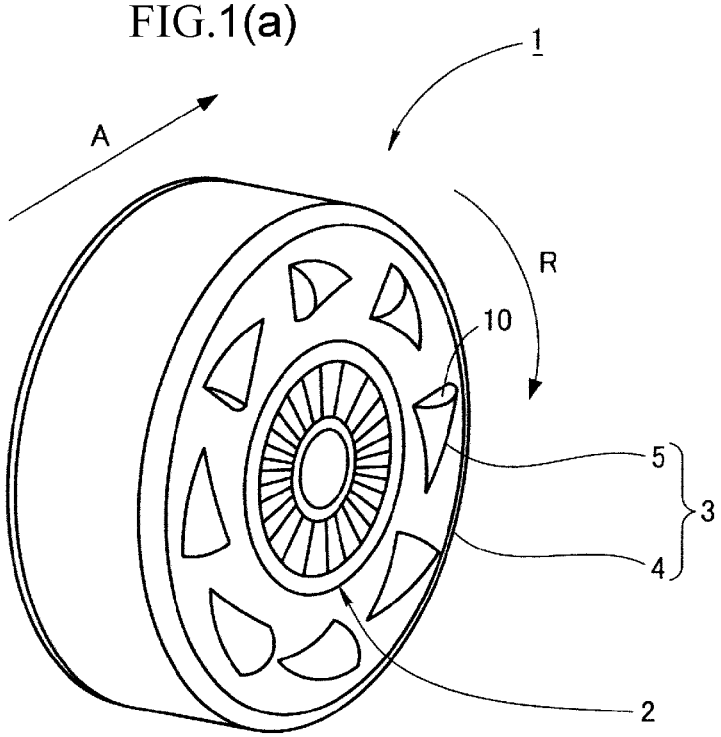
FIGS. 1(a)-1(c) show a wheel to which an aircraft tire in accordance with an exemplary embodiment of the invention is mounted, with FIG. 1(a) being a general perspective view, FIG. 1(b) being a side view and FIG. 1(c) being a front view of the wheel.
Figure 1B:
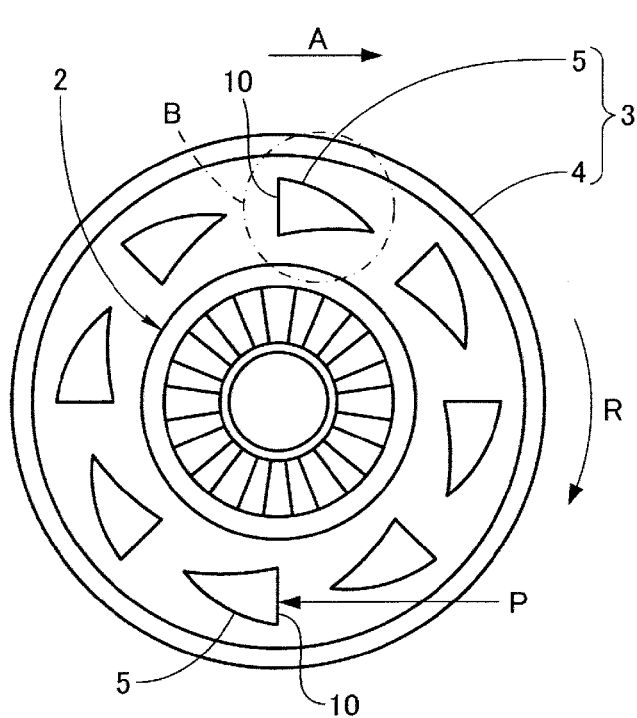
Figure 1C:
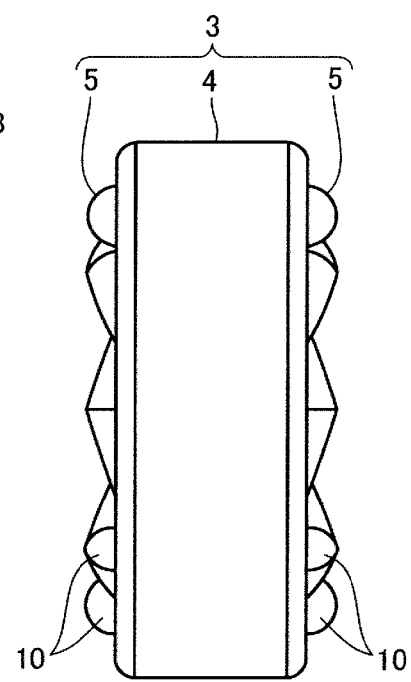

An aircraft wheel 1 shown in FIGS. 1(a) to 1(c) is constructed by mounting an aircraft tire 3 to a wheel 2 and rotates during a landing roll in a direction of arrow R in the drawings with respect to an aircraft flight direction of arrow A in the drawings.

(Description of the Aircraft Tire)

The aircraft tire 3 includes a tire body 4 that constitutes an outer peripheral part of the wheel 1, and a plurality of protrusions 5 which are formed integrally with the tire body 4 on a side of the tire body 4 and arranged circumferentially at a predetermined pitch for receiving flight wind pressure (indicated by arrow P in FIG. 1(b)). By the action of the flight wind pressure received by the protrusions 5, the wheel 1 can be rotated ahead of touchdown in the direction (of arrow R) in which wheel 1 rotates during the landing roll.

(Description of the Protrusions)

Each protrusion 5 has, at its base end which is rear in the rotating direction of the wheel 1, a semicircular wind pressure receiving face 10 for receiving the flight wind pressure.

The protrusion 5 has such a streamline shape that it narrows to taper toward its leading end while its protruding height relative to the side of the tire body 4 reduces as the protrusion 5 extends from the wind pressure receiving face 10 in the rotating direction of wheel 1. Such a streamline shape does not cause air turbulence and can prevent abnormal sound. It is to be noted that the streamline shape can appropriately be made longer or shorter than the one shown in this embodiment.

As shown in FIG. 2, a hollow part 11 is formed inside the protrusion 5 in an area between the wind pressure receiving face 10 and a middle position of the protrusion 5 along the rotating direction of the wheel 1. This hollow part 11 is a virtually semicylindrical space having a required expansion in a radial direction of the tire body 4 as well as along the protruding height relative to the side of the tire body 4.

The protrusion 5 has a slit 12 formed near the leading end of the protrusion 5 along the rotating direction of the wheel 1, and a weight insertion passage 13 is formed as a connection between the slit 12 and the hollow part 11.

(Description of a Weight)

A weight 15, made of iron, and which has hemispherical ends and a cylindrical middle part thus to have a capsule shape as a whole, is inserted into the hollow part 11 from the slit 12 through the weight insertion passage 13.

Normally, the weight insertion passage 13 is closed due to elastic restoring force of the protrusion 5 or is in a constricted state inhibiting passage of the weight 15. The weight 15 can be inserted into the hollow part 11 by pressing the leading end of the weight 15 against the slit 12 to widen the slit 12, pressing the weight 15 from the slit 12 into the weight insertion passage 13 against the elastic restoring force of the protrusion 5 and then pressing the weight 15 further to expand the weight insertion passage 13. Once the weight 15 goes into the hollow part 11, the weight insertion passage 13 is closed by the elastic restoring force of the protrusion 5 or is constricted enough to inhibit the passage of the weight 15, so that the weight 15 does not leave the hollow part 11.

(Description of a Rotational Motion of the Wheel at the Time of Landing)

When the wheel 1 shown in FIGS. 1(a) to 1(c) juts out of an aircraft in the landing process, as shown in FIG. 1(b), the wheel 1 is rotated ahead of the touchdown in the direction (indicated by arrow R in the drawing) in which the wheel 1 rotates during the landing roll by the action of the flight wind pressure (indicated by arrow P in the drawing) received by the wind pressure receiving face 10 of the protrusion 5.

(Description of Changes in Flight Wind Pressure Receiving Area)

Figure 3A:
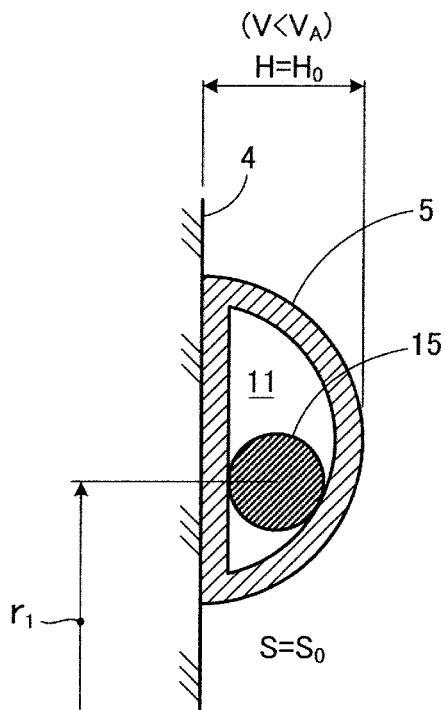
FIGS. 3(a)-3(d) are sectional views taken along line C-C in FIG. 2, with FIG. 3(a) being a state view of a weight in a radially inward position of a hollow part, FIG. 3(b) being a state view of the weight in a radially outward position of the hollow part and FIGS. 3(c) and 3(d) being state views of a protrusion elastically deformed by the weight.

In a speed range in which an actual rotating speed V of the wheel 1 ahead of the touchdown (hereinafter referred to as an actual rotating speed V) is lower than a rotating speed $V_A$ (hereinafter referred to as a target rotating speed $V_A$) which is consistent with a flying speed of the aircraft making the touchdown (for example, about 250 km/h), the weight 15 inside the hollow part 11 of the protrusion 5 is in a radially inward position indicated by a radius $r_1$ of FIG. 3(a) that extends from the center of the wheel 1. Here, a protruding height H of the protrusion 5 is equal to an initial height $H_0$, and a pressure receiving area S of the wind pressure receiving face 10 is equal to an initial area $S_0$.

Figure 3B:
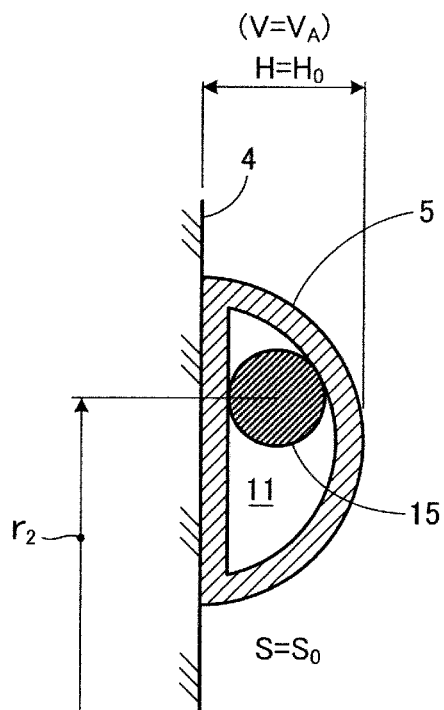

As the wheel 1 gains speed through the action of the flight wind pressure received by the wind pressure receiving face 10, centrifugal force applied to the weight 15 increases, thereby moving the weight 15 radially outward. When the actual rotating speed V reaches the target rotating speed $V_A$, the weight 15 inside the hollow part 11 moves to a radially outward position indicated by a radius $r_2$ of FIG. 3(b) that extends from the wheel center. Here, the protruding height H of the protrusion 5 is still equal to the initial height $H_0$, and the pressure receiving area S of the wind pressure receiving face 10 is still equal to the initial area $S_0$.

Figure 3C:
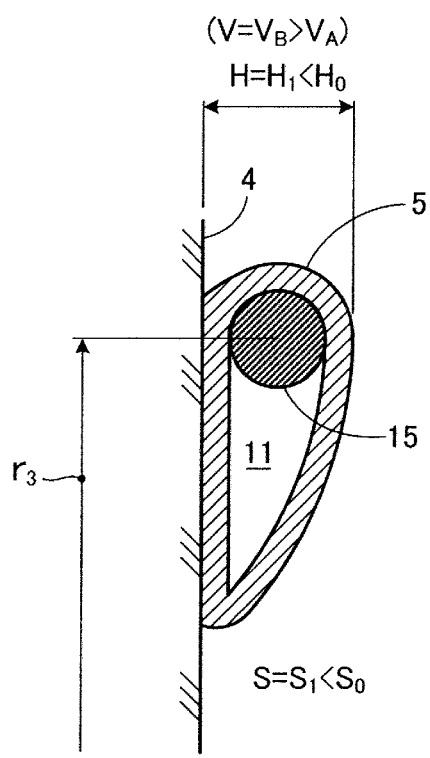
Figure 3D:
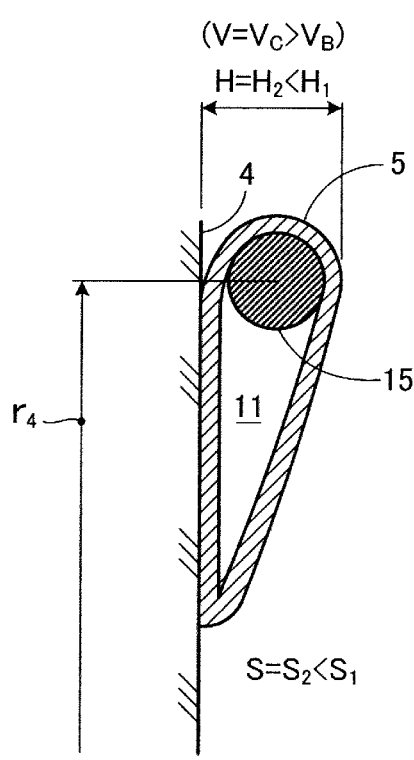

When the actual rotating speed V increases from the target rotating speed $V_A$ to a speed $V_B$ and then reaches a speed $V_C$, as shown in FIGS. 3(c) and 3(d), the weight 15 inside the hollow part 11 moves radially outward from the position indicated by the radius $r_2$ through a position indicated by a radius $r_3$ to a position indicated by a radius $r_4$ extending from the wheel center. Accordingly, the hollow part 11 is urged radially outward by the weight 15, and the projection 5 is elastically deformed so as to flatten the hollow part 11. As a result, the protruding height H of the protrusion 5 is reduced from the initial height $H_0$ through a height $H_1$ to a height $H_2$, while the pressure receiving area S of the wind pressure receiving face 10 is reduced from the initial area $S_0$ to an area $S_2$ via an area $S_1$.

(Description of Effects)

In the aircraft tire 3 of the present embodiment, by the action of the flight wind pressure received by the protrusion 5 provided on the side of the tire body 4, the wheel 1 is rotated ahead of the touchdown in the direction in which the wheel 1 rotates during the landing roll, so that pressurized friction between a runway and the tire can be reduced substantially during the landing of the aircraft, thereby allowing suppression of rubber tire wear which occurs during the landing.

Until the actual rotating speed V of the wheel 1 reaches the target rotating speed $V_A$, the flight wind pressure receiving area S of the wind pressure receiving face 10 remains as the initial area $S_0$, and the wheel 1 gains speed through the action of the flight wind pressure to reach the target rotating speed $V_A$ before the touchdown.

When the actual rotating speed V of the wheel 1 exceeds the speed $V_A$ and increases to the speed $V_B$ and then to the speed $V_C$, the flight wind pressure receiving area S of the wind pressure receiving face 10 reduces from the initial area $S_0$ to the area $S_1$ and then to the area $S_2$ accordingly, whereby the acceleration of the wheel 1 is reduced, and the actual rotating speed V decreases toward the target rotating speed $V_A$ due to mechanical frictional resistance of the wheel 1 or the like.

If the actual rotating speed V becomes lower than the target rotating speed $V_A$ through such influence of deceleration, the centrifugal force applied to the weight 15 decreases, whereby the protrusion 5 returns from its deformed state to its original shape. With the pressure receiving area S of the wind pressure receiving face 10 returned to the initial area $S_0$, the wheel 1 accelerates again through the accelerating action of the flight wind pressure, thus increasing its speed toward the target rotating speed $V_A$ again.

In this way, the rotating speed of the wheel 1 is brought close to the rotating speed which is consistent with the flying speed of the aircraft making the touchdown (i.e., the target rotating speed $V_A$), while repeating its acceleration and deceleration with the target rotating speed $V_A$ being in between, thereby reducing a rotating speed difference (V-$V_A$) between the actual rotating speed V and the target rotating speed $V_A$. Consequently, shocks that accelerate or decelerate the aircraft at the touchdown can be suppressed.

The embodiment of the aircraft tire according to the present invention has been described above. However, the present invention is not limited to the structure described in the above embodiment and allows appropriate variations on the structure without departing from the spirit of the invention.

For example, although in the above-described embodiment, the weight 15 inserted into the hollow part 11 is a solid lump, the invention is not limited to this, and the weight may instead be in the form of liquid, gel or granules (not shown) to be inserted into the hollow part 11 of the protrusion 5.

In the above-described embodiment, the wind pressure receiving face 10 has the semicircular shape. However, the invention is not limited to this. An arbitrary shape such as a triangular shape shown in FIG. 4(b) or a quadrilateral (or trapezoidal) shape shown in FIG. 4(c) can be adopted instead as long as the shape can receive the flight wind pressure.

Figure 4A:
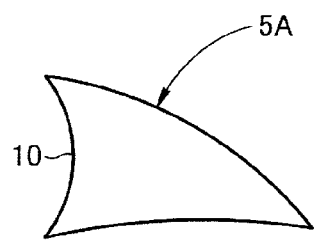
FIGS. 4(a)-4(k) show variations of the protrusion provided to the aircraft tire.
Figure 4B:
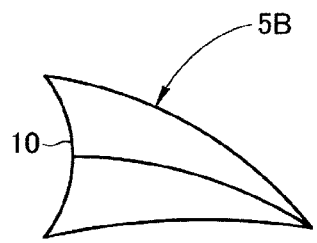
Figure 4C:
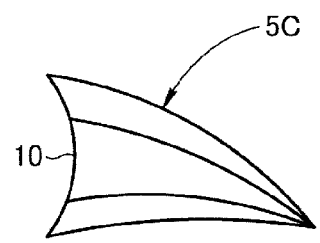
Figure 4D:
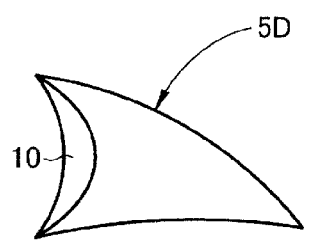
Figure 4E:
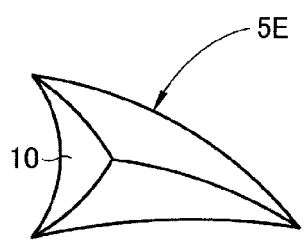
Figure 4F:
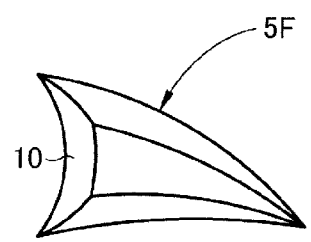

The wind pressure receiving face 10 shown in the above embodiment is a plane surface rising at a right angle from the side of the tire body 4, thus serving as a plane perpendicular to the flight wind pressure. However, as shown in FIG. 4(a), 4(b) or 4(c), the wind pressure receiving face 10 may be curved toward the rotating direction of the wheel 1 so as to receive the flight wind pressure more effectively and furthermore, may slant toward the rotating direction of the wheel 1 as shown in FIG. 4(d), 4(e) or 4(f) to form an obtuse angle with respect to the side of the tire body 4 for the purpose of improving aerodynamic flow of flight wind.

Figure 4G:
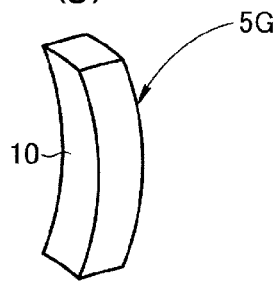
Figure 4H:
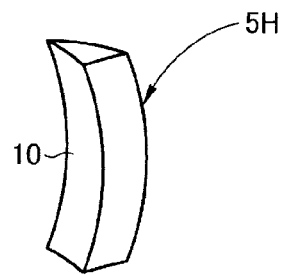
Figure 4I:
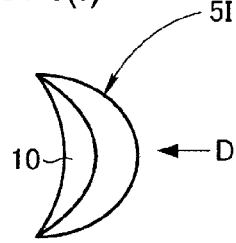
Figure 4J:
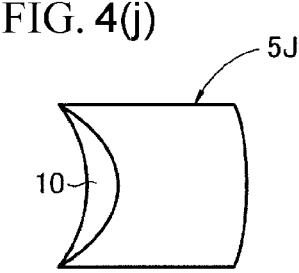
Figure 4K:
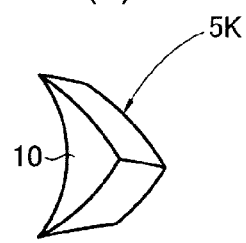

In the above embodiment, the protrusion having the streamline shape has been adopted. However, the invention is not limited to this, and a block-type protrusion shaped like a square pole (see FIG. 4(g)), a triangle pole (see FIG. 4(h)), a hemisphere or hemiellipsoid (see FIG. 4(i)), a semicylinder (see FIG. 4(j)) or a triangular plate (see FIG. 4(k)) can be adopted instead. In the case of a protrusion 51 shown in FIG. 4(i) as a representative example for explanation, a whirling airflow at a place, indicated by arrow D in the drawing, and which is located downstream of the rotating direction of the wheel 1, allows the rotating speed V of the wheel 1 to reach the target rotating speed $V_A$ faster.

As shown in FIGS. 4(g) to 4(k), the respective wind pressure receiving faces 10 of block-type protrusions 5G to 5K may be curved toward the rotating direction of the wheel 1 and may each slant to form an obtuse angle with respect to the side of the tire body 4.

INDUSTRIAL APPLICABILITY

An aircraft tire according to the present invention has the characteristics of being capable of suppressing rubber tire wear during landing and shocks that accelerate or decelerate an aircraft at touchdown and therefore, is suitable for use as a wheel tire for an aircraft which lands at a high flying speed.

The invention claimed is:
1. An aircraft tire comprising:
a protrusion for receiving flight wind, provided on a side of a tire body that constitutes an outer peripheral part of an aircraft wheel, the aircraft wheel made to rotate ahead of touchdown in a direction in which the wheel rotates during a landing roll by the action of the flight wind pressure received by the protrusion,
wherein the protrusion has hollow structure into which a weight is inserted and the protrusion is deformed by centrifugal force applied to the weight in association with a rotational motion of the wheel thereby to change a flight wind pressure receiving area so that a rotating speed of the wheel ahead of the touchdown is brought close to a rotating speed of the wheel that is consistent with a flying speed of the aircraft at the time of the touchdown.

* * * * *